(12) United States Patent
Wang

(10) Patent No.: US 8,566,074 B2
(45) Date of Patent: Oct. 22, 2013

(54) MAPPING BETWEEN STRESS-TEST SYSTEMS AND REAL WORLD SYSTEMS

(75) Inventor: Wanjun Wang, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 1157 days.

(21) Appl. No.: 12/468,622

(22) Filed: May 19, 2009

(65) Prior Publication Data

US 2010/0299129 A1    Nov. 25, 2010

(51) Int. Cl.
   *G06F 9/45*      (2006.01)
   *G06F 15/173*    (2006.01)

(52) U.S. Cl.
   USPC .......................................... 703/22; 709/224

(58) Field of Classification Search
   USPC ........................................... 709/224; 703/22
   See application file for complete search history.

(56) References Cited

U.S. PATENT DOCUMENTS

| | | | |
|---|---|---|---|
| 5,812,780 A * | 9/1998 | Chen et al. | 709/224 |
| 7,890,315 B2 * | 2/2011 | Meier et al. | 703/22 |
| 7,984,126 B2 * | 7/2011 | McBride | 709/223 |
| 2003/0229695 A1 * | 12/2003 | McBride | 709/224 |

* cited by examiner

*Primary Examiner* — Kamini S Shah
*Assistant Examiner* — Juan Ochoa
(74) *Attorney, Agent, or Firm* — Yudell Isidore Ng Russell PLLC

(57) ABSTRACT

A method, system and computer program product for determining the reliability of a software system. Test data inputs are utilized to simulate conditions under which software is executed. One or more test data inputs replace variables in a first algorithm and a second algorithm. The first algorithm and the second algorithm determine a first test parameter and a second test parameter, respectively. The first test parameter and second test parameters are transmitted to a third algorithm along with selected test data inputs. The third algorithm evaluates the input of the first test parameter, second test parameter and selected test data inputs, and calculates the projected number of users for the software. The projected number of users for the software is output to facilitate optimal usage of the software system.

17 Claims, 5 Drawing Sheets

MAPPING BETWEEN STRESS-TEST SYSTEMS AND REAL WORLD SYSTEMS

BACKGROUND

1. Technical Field

The present invention generally relates to computer systems and in particular to simulation software systems in computer systems.

2. Description of the Related Art

Prior to the release of a software system, the software system is tested utilizing automated concurrent end-users. The automated concurrent end-users stress test the software system on a computer system that is similar to the computer system in which the software may be installed. The stress-test may run for a predetermined duration of time to verify the computer systems and/or software's reliability, availability, and sustainability.

Testing the reliability, availability, and sustainability of the software may require conducting extreme test on the software and/or computer system. During the test, evaluations are performed to analyze the throughput and/or response of the software and computer system. The results retrieved from the automated test are pass/fail results, and the information retrieved has no real association with the "real-world" software and/or computer system activity.

During automated application test, Web applications are often associated with concurrent activity; however, the Web application activity is random and discrete. For example, if a number of clients are utilizing a Web application, the likelihood that all clients will conduct actions simultaneously, such as with an automated test, is a very low probability. Unless the activity of the clients working on the Web applications is synchronized, the activity is most likely to be random and/or out of sync. In addition, the activity of clients on a web application is discrete. For instance, typically clients of a Web application do not perform continuous actions on the Web application. A client may perform a number of actions on the Web application, and then continue to another application.

SUMMARY OF ILLUSTRATIVE EMBODIMENTS

Disclosed are a method, system and computer program product for determining the projected usage and reliability of a software system. Test data inputs (e.g. expected time periods for utilizing software, duration of software utilization, number of expected users, etc.) are utilized to simulate conditions under which a software system is executed. One or more test data inputs replace variables in a first algorithm and a second algorithm. The first algorithm and the second algorithm determine a first test parameter and a second test parameter, respectively. The first test parameter is calculated when test data inputs are evaluated by the first algorithm. When the second algorithm evaluates the test data inputs, the second test parameter is calculated. The first test parameter and second test parameters are transmitted to a third algorithm along with selected test data inputs. The third algorithm evaluates the input of the first test parameter, second test parameter and selected test data inputs, and calculates the projected number of users for the software system. The reliability of the software system is determined by the number of users the system sustains in an environment characterized by one or more test data inputs. The predefined target parameter (e.g. projected number of users) for the software system, as calculated by the algorithms, is output to facilitate optimal usage of the software system.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
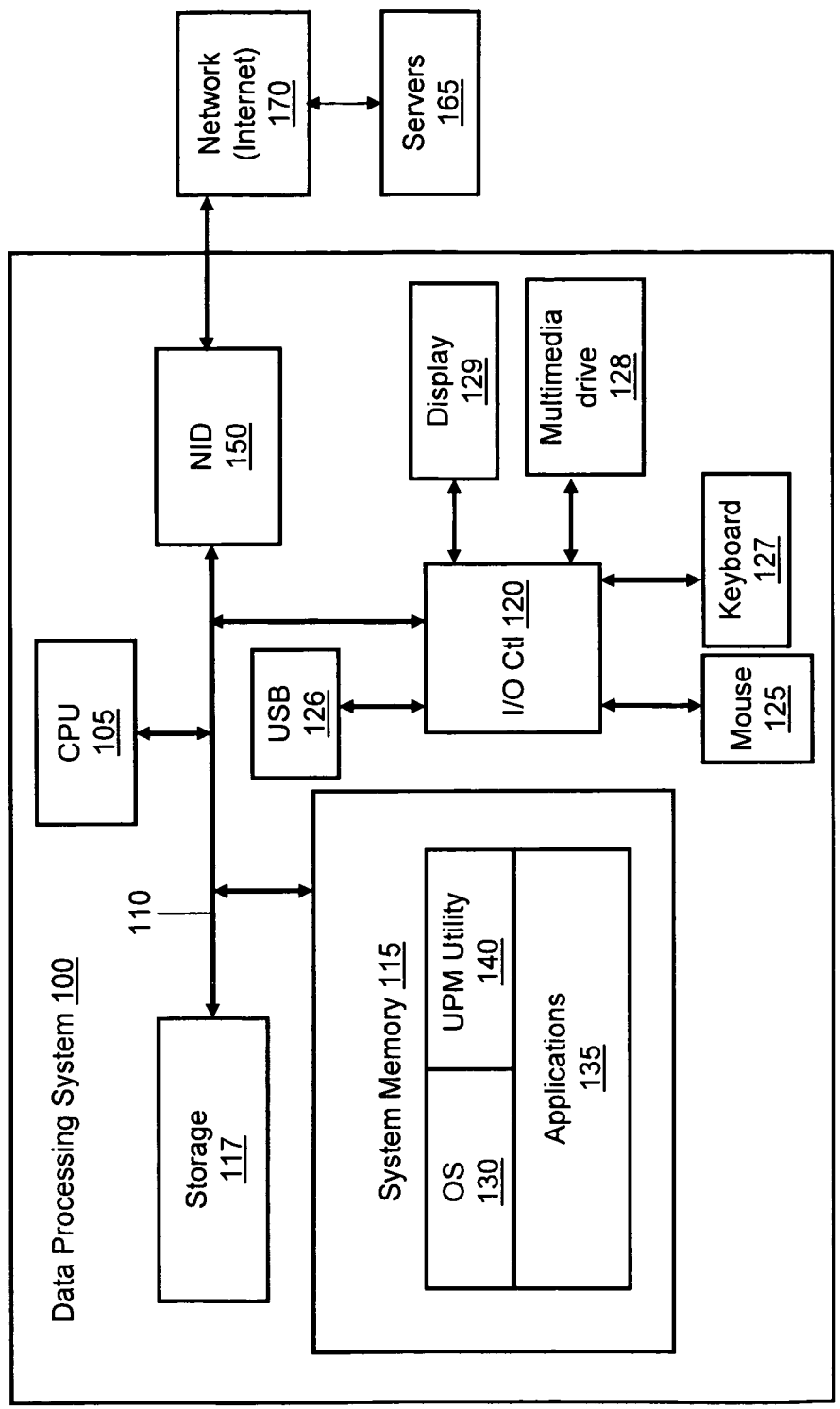
FIG. 1 provides a block diagram representation of a data processing system, within which various features of the invention may advantageously be implemented, according to one embodiment of the invention.

The illustrative embodiments provide a method, system and computer program product for determining the projected usage and reliability of a software system. Test data inputs (e.g. expected time periods for utilizing software, duration of software utilization, number of expected users, etc.) are utilized to simulate conditions under which a software system is executed. One or more test data inputs replace variables in a first algorithm and a second algorithm. The first algorithm and the second algorithm determine a first test parameter and a second test parameter, respectively. The first test parameter is calculated when test data inputs are evaluated by the first algorithm. When the second algorithm evaluates the test data inputs, the second test parameter is calculated. The first test parameter and second test parameters are transmitted to a third algorithm along with selected test data inputs. The third algorithm evaluates the input of the first test parameter, second test parameter and selected test data inputs, and calculates the projected number of users for the software system. The reliability of the software system is determined by the number of users the system sustains in an environment characterized by one or more test data inputs. The predefined target parameter (e.g. projected number of users) for the software system, as calculated by the algorithms, is output to facilitate optimal usage of the software system.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, the term software system is utilized interchangeably with software, and system. The methods applied to a software system herein are applicable to a production system. A production system, as utilized herein, describes any application or system that executes one or more concurrent operations with one or more concurrent users.

With reference now to the figures, and beginning with FIG. 1, there is depicted a block diagram representation of an example data processing system (DPS), as utilized within one embodiment. DPS may be a computer, a portable device, such as a personal digital assistant (PDA), a smart phone, and/or other types of electronic devices that may generally be considered processing devices. As illustrated, DPS 100 comprises at least one processor or central processing unit (CPU) 105 connected to system memory 115 via system interconnect/bus 110. Also connected to system bus 110 is input/output (I/O) controller 120, which provides connectivity and control for input devices, of which pointing device (or mouse) 125 and keyboard 127 are illustrated. I/O controller 120 also provides connectivity and control for output devices, of which display 129 is illustrated. Additionally, a multimedia drive 128 (e.g., compact disk read/write (CDRW) or digital video disk (DVD) drive) and USB (universal serial bus) port 126 are illustrated, coupled to I/O controller 120. Multimedia drive 128 and USB port 126 enable insertion of a removable storage device (e.g., optical disk or thumb drive) on which data/instructions/code may be stored and/or from which data/instructions/code may be retrieved. DPS 100 also comprises storage 117, within/from which data/instructions/code may also be stored/retrieved.

DPS 100 is also illustrated with a network interface device (NID) 150, by which DPS 100 may connect to one or more access/external networks 170, of which the Internet is provided as one example. NID 150 may be configured to operate via wired or wireless connection to an access point of the network. Network 170 may be an external network such as the Internet or wide area network (WAN), or an internal network such as an Ethernet (local area network—LAN) or a Virtual Private Network (VPN). Connection to the external network 170 may be established with one or more servers 165, which may also provide data/instructions/code for execution on DPS 100, in one embodiment.

In addition to the above described hardware components of DPS 100, various features of the invention are completed/supported via software (or firmware) code or logic stored within system memory 115 or other storage (e.g., storage 117) and executed by CPU 105. Thus, for example, illustrated within system memory 115 are a number of software/firmware/logic components, including operating system (OS) 130 (e.g., Microsoft Windows®, a trademark of Microsoft Corp, or GNU®/Linux®, registered trademarks of the Free Software Foundation and The Linux Mark Institute), applications 135, and user projection mapping (UPM) utility 140 (which executes on CPU 105 to provide UPM logic). In actual implementation, UPM utility 140 may be combined with or incorporated within applications 135 to provide a single executable component, collectively providing the various functions of each individual software component when the corresponding combined code is executed by the CPU 105. For simplicity, UPM utility 140 is illustrated and described as a stand alone or separate software/firmware component, which provides specific functions, as described below.

In one embodiment, servers 165 include a software deploying server, and DPS 100 communicates with the software deploying servers (165) via network (e.g., Internet 170) using network interface device 150. Then, the UPM utility 140 may be deployed from the network, via software deploying servers 165. With this configuration, software deploying servers perform all of the functions associated with the execution of UPM utility 140. Accordingly, DPS 100 is not required to utilize internal computing resources of DPS 100 to execute UPM utility 140.

CPU 105 executes UPM utility 140 as well as OS 130, which supports the user interface features of UPM utility 140. In the described embodiment, UPM utility 140 generates/provides several graphical user interfaces (GUI) to enable user interaction with, or manipulation of, the functional features of UPM utility 140. Certain functions supported and/or implemented by UPM utility generate processing logic executed by processor and/or device hardware to complete the implementation of that function. For simplicity of the description, the collective body of code that enables these various features is referred to herein as UPM utility 140. Among the software code/instructions/logic provided by UPM utility 140, and which are specific to the invention, are: (a) code for detecting test data inputs at a first algorithm, whereby the first algorithm determines a first test parameter and a second test parameter; (b) code for receiving the test data inputs at the first algorithm; (c) code for calculating the first test parameter and the second test parameter via the first algorithm; (d) code for calculating projected system usage via a second mapping algorithm; and (e) code for outputting the projected system usage. According to the illustrative embodiment, when CPU 105 executes UPM utility 140, DPS 100 initiates a series of functional processes that enable the above functional features as well as additional features/functionality. These features/functionality are described in greater detail below within the description of FIGS. 2-5.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
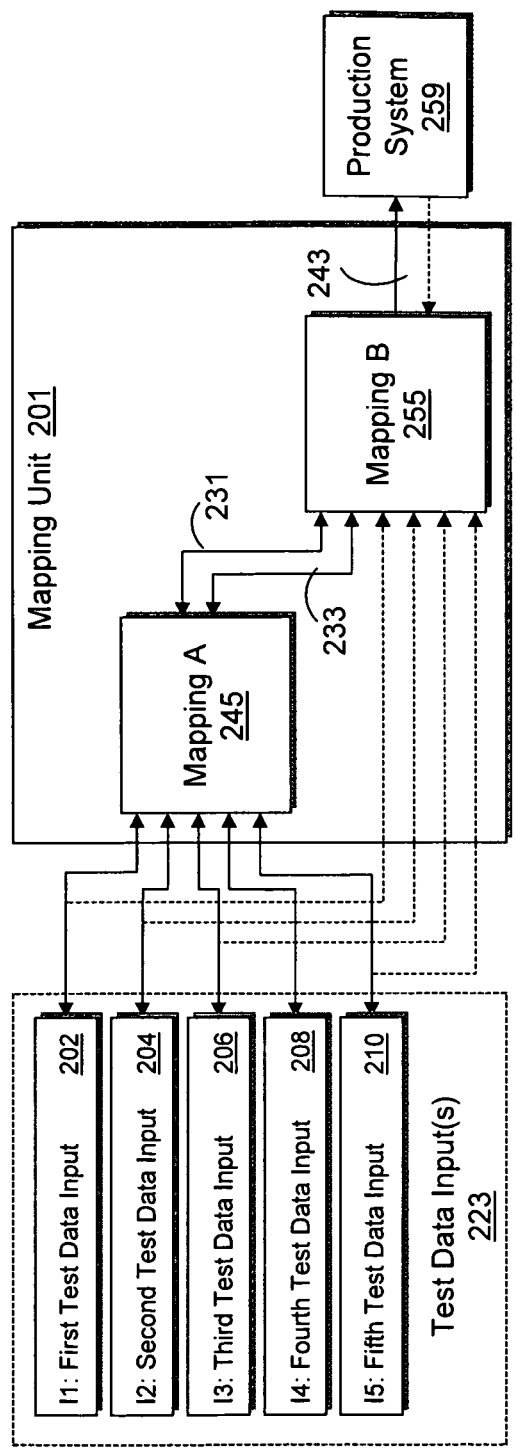
FIG. 2 is a diagram that illustrates the input and output activity of a mapping unit for calculating projected system usage, in accordance with one embodiment of the invention.

With reference now to FIG. 2, there is depicted the input and output activity of a mapping unit for calculating projected system usage. The projected system usage is a calculation of the number of real world users of a software system under real-world conditions. Projected system usage also includes, but is not limited to the calculation of real world user distribution. FIG. 2 includes mapping unit 201, test data input 223, and projected software system usage 243. Within mapping unit 201 are mapping component A 245, mapping component B 255, and test parameter A 231 and test parameter B 233. Test data input 223 comprises: first test data input (I1) 202, second test data input (I2) 204, third test data input (I3) 206, fourth test data input (I4) 208, and fifth test data input (I5) 210. The test data inputs are described as the following: first test data input 202 is an estimated length of time a real user is active on a system; second test data input 204 is an estimated duration of time for the real user to complete a manual iteration of a test activity; third test data input 206 is an estimated duration of time for completing automated iterations of the test activity; fourth test data input 208 is a number of real users expected to execute the test activity on the system in the estimated time period; and fifth test data input 210 is a number of estimated manual iterations performed on the system by the real user in the estimated time period.

In one embodiment, test data inputs are received at a first algorithm and a second algorithm for calculating the first test parameter and a second test parameter. The test data inputs are detected at the first algorithm and the second algorithm within mapping component A 245. Mapping component A 245 generates test parameter A 231 and test parameter B 233 utilizing one or more tests data inputs test parameter A 231 and test parameter B 233 are calculated via the first algorithm and the second algorithm. The first algorithm and the second algorithm are associated with mapping component A 245. Test parameter A 231 and test parameter B 233 are generated when mapping component A 245 receives first test data input 202, second test data input 204, third test data input 206, fourth test data input 208, and fifth test data input 210.

In embodiment, first test parameter, second test parameter, first test data input, second test data input, third test data input, and fifth test data input are received at the third algorithm. The third algorithm is associated with mapping component B 255. Test parameter A 231, test parameter B 233, first test data input 202, second test data input 204, third test data input 206, and fifth test data input 208 are detected and evaluated at mapping component B 255, via the third algorithm. The evaluation at mapping component B 255 generates projected software system usage 243. Projected software system usage 243 is output to production system 259.

In another embodiment, the software system usage (243) is a gauge to determine a peak usage point of the software system. Production system 259 utilizes the software system to manage online operations. Projected software system usage 243 is transmitted to production system 259. UPM utility (140) records a response time for one or more activities of production system. A peak usage point is stored as a benchmark for peak activity of the software system when production system 259 reaches a climax of activity. UPM utility (140) monitors the response time while production system 259 performs the one or more activities. When the response time of the software system is equal to the benchmark, an alert is generated. The generated alert identifies the need to adjust one or more activities of the software and/or the hardware components within production system 259.

In one embodiment, the software system usage (243) is transmitted from production system 259 to mapping unit 201. Transmitting software system usage 243 from production system 259 to mapping unit 201 enables production system 259 to debug problems associated with online operations (production to test debugging). When projected software system usage 243 is transmitted to mapping unit 201 UPM utility (140) utilizes one or more of mapping component A 245 and mapping component B 255 to output one or more of first test data input (I1) 202, second test data input (I2) 204, third test data input (I3) 206, fourth test data input (I4) 208, and fifth test data input (I5) 210.

Figure 3:
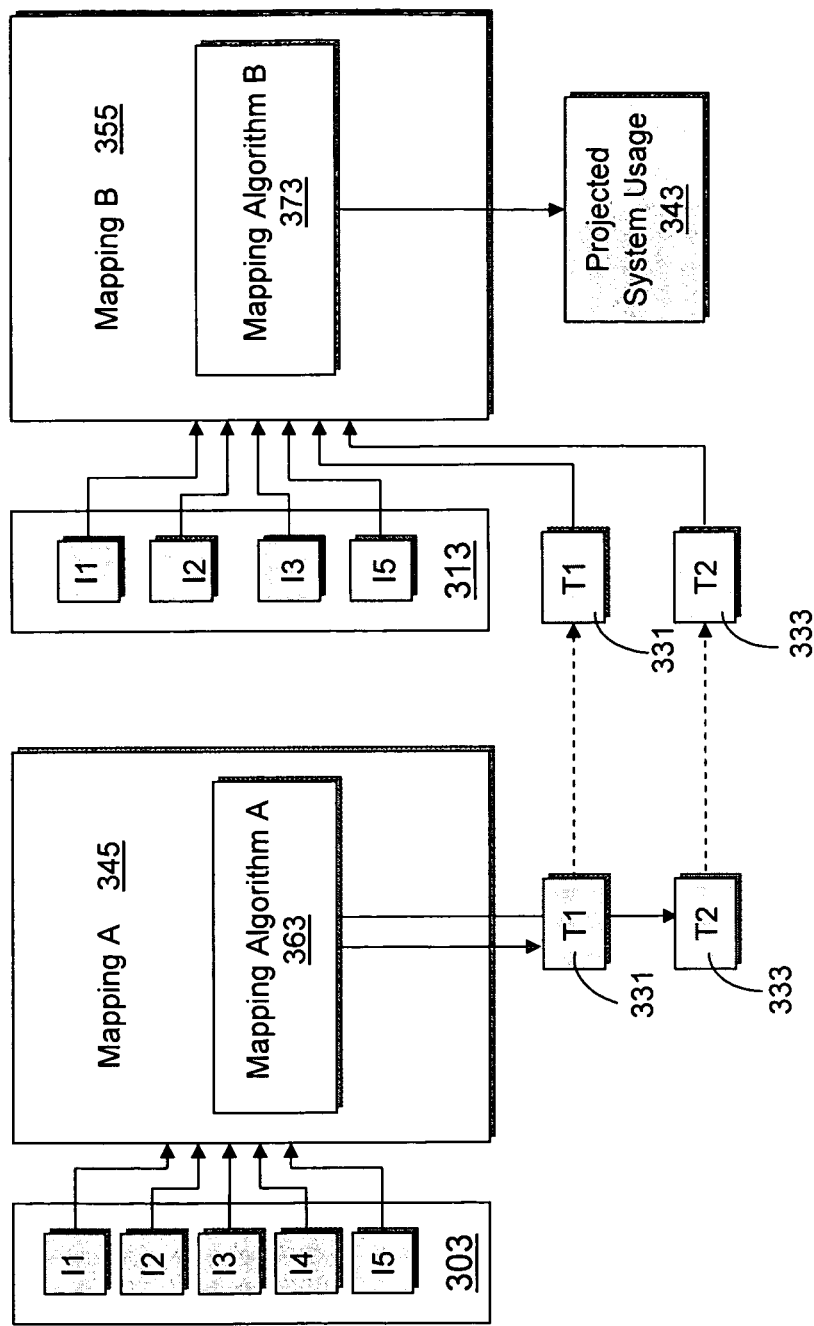
FIG. 3 is a schematic diagram illustrating input and output activity of a first mapping algorithm and a second mapping algorithm, according to one embodiment of the invention.

FIG. 3 illustrates a block diagram of a system for analyzing one or more inputs of one or more mapping algorithms. Mapping component A 345 includes mapping algorithm A 363, which receives input from test data input A 303. Mapping algorithm A 363 generates first test parameter 331 and second test parameter 333. Mapping component B 355 includes mapping algorithm B 373. Test data input B 313 is input into mapping algorithm B 373 at mapping component B 355. Mapping algorithm 373 receives test data input B 313, first test parameter 331, and second test parameter 333. Projected system usage 343 (i.e. projected number of real users and distribution of real users) is generated when mapping algorithm B 373 analyzes test data input B 313, first test parameter (T1) 331, and second test parameter (T2) 333.

In one embodiment, mapping algorithm A 363 comprises two or more algorithms. For example, within mapping algorithm A 363 is a first algorithm that calculates test parameter 331 and a second algorithm that calculates second test parameter 333. First algorithm and second algorithm of mapping algorithm A 363, receive test data input A 303. Test data input A 303 comprises first test data input (I1) (FIG. 2 202), second test data input (I2) (FIG. 2 204), third test data input (I3) (FIG. 2 206), fourth test data input (I4) (FIG. 2 208), and fifth test data input (I5) (FIG. 2 210). A first test parameter and a second test parameter are calculated by a first algorithm and a second algorithm, respectively. Specifically, first test parameter 331 is calculated utilizing the following first algorithm: roundup((I4/((I1*60/I3)/I5)), 0). Second test parameter 333 is calculated utilizing the following second algorithm: rounddown(((I1*3600−rounddown(I4*I5/T1, 0)*I3*60)/rounddown(I4*I5/T1, 0)), 0). First test parameter 331 is the number of concurrent automated users and second test parameter 333 is the time delay prior to an iteration of an activity. First test parameter 331 and second test parameter 333 are generated as outputs from mapping algorithm A 363. First test parameter 331 and second parameter 333 are transmitted to mapping algorithm B 373.

In one embodiment, the projected system usage is calculated via a third algorithm of mapping algorithm B 373. First test data input (I1), second test data input (I2), third test data input (I3), and fifth test data input (I4) of test data input B 313 are evaluated with first test parameter 331 and second test parameter 333, utilizing the third algorithm. Specifically, projected system usage is calculated via the following third algorithm: (I1*3600/(T2+I3*60)/I5*T1). Mapping algorithm B 373 outputs the projected system usage when the calculation is complete.

In another embodiment, mapping algorithm A 363 comprises two or more even distribution-based algorithms. For example, within mapping algorithm A 363 is a first algorithm that calculates test parameter 331 and a second algorithm that calculates second test parameter 333, whereby test parameter 331 and test parameter 333 are test parameters for the even distribution of real users. First algorithm and second algorithm of mapping algorithm A 363, receive test data input A 303. Test data input A 303 comprises first test data input (I1) (FIG. 2 202), second test data input (I2) (FIG. 2 204), third test data input (I3) (FIG. 2 206), fourth test data input (I4) (FIG. 2 208), and fifth test data input (I5) (FIG. 2 210). A first test parameter and a second test parameter are calculated by a first even distribution-based algorithm and a second even distribution-based algorithm, respectively. Specifically, first test parameter 331 is calculated utilizing the following first even distribution-based algorithm: roundup((I4/((I1*60/I3)/I5)), 0). Second test parameter 333 is calculated utilizing the following second even distribution-based algorithm: roundup(((I1*3600−roundup(I4*I5/T1, 0)*I3*60)/roundup(I4*I5/T1, 0)), 0). First test parameter 331 is the number of concurrent automated users and second test parameter 333 is the time delay prior to an iteration of an activity. First test parameter 331 and second test parameter 333 are generated as outputs from mapping algorithm A 363 for an even distribution of real world users. First test parameter 331 and second parameter 333 are transmitted to mapping algorithm B 373.

In another embodiment, the projected system usage is calculated via a third algorithm of mapping algorithm B 373, whereby the third algorithm is an algorithm for an even-distribution of real users. First test data input (I1), second test data input (I2), third test data input (I3), and fifth test data input (I4) of test data input B 313 are evaluated with first test parameter 331 and second test parameter 333, utilizing the third algorithm. First test parameter 331 and second test parameter 333 are calculated utilizing the first and second even distribution based algorithm, respectively. The even distribution-based algorithm for mapping algorithm B 373 is the third even distribution-based algorithm of: (I1*3600/(I5+I3*60)/I6*I4). Mapping algorithm B 373 outputs the projected system usage for and even distribution of real users when the calculation is complete.

Figure 4:
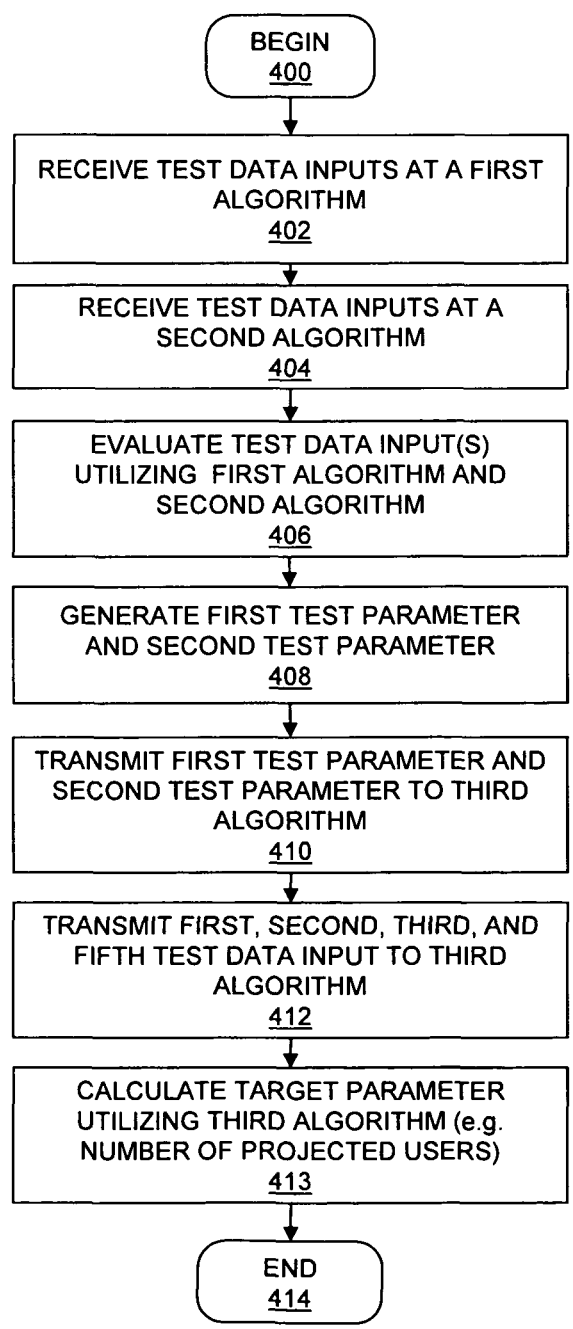
FIG. 4 is a flow chart illustrating the method by which real-world systems are mapped to stress test systems, in accordance with one embodiment of the invention.
Figure 5:
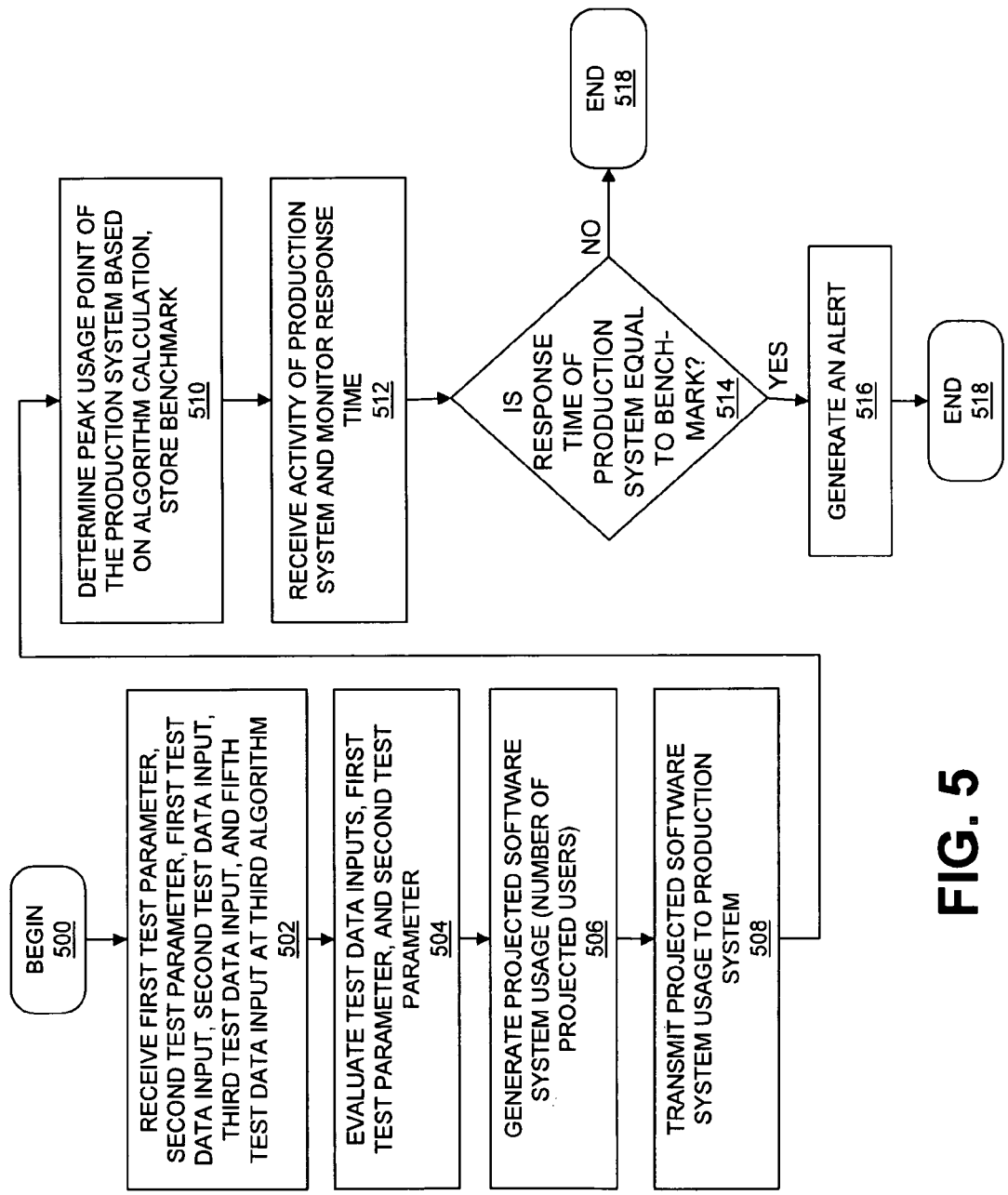
FIG. 5 is a flow chart illustrating the method by which stress test systems are mapped to real world systems, according to one embodiment of the invention.

FIGS. 4-5 are flow charts illustrating various methods by which the above processes of the illustrative embodiments are completed. Although the methods illustrated in FIGS. 4-5 may be described with reference to components shown in FIGS. 1-3, it should be understood that this is merely for convenience and alternative components and/or configurations thereof can be employed when implementing the various methods. Key portions of the methods may be completed by UPM utility 140 executing on processor 105 within DPS 100 (FIG. 1) and controlling specific operations of DPS 100, and the methods are thus described from the perspective of both UPM utility 140 and DPS 100.

FIG. 4 depicts the process by which one or more target parameters describing projected software system usage is determined (i.e. real-world systems are mapped to stress test systems). The process of FIG. 4 begins at initiator block 400 and proceeds to block 402, at which test data inputs are received at a first algorithm. At block 404 the test data inputs are received at a second algorithm. Utilizing the first algorithm and the second algorithm the test data inputs are evaluated at block 406. Following evaluation of the test data inputs, a first test parameter and a second test parameter are generated, at block 408. At block 410 the first test parameter and the second test parameter are transmitted to a third algorithm. In addition to the first test parameter and the second test parameter, the following test data inputs are transmitted to the third algorithm, at block 412: first test data input (FIG. 2 202), second test data input (FIG. 2 204), third test data input (FIG. 2 206), and fifth test data input (FIG. 2 210). At block 413 the target parameter (e.g. real world user distribution, number of real world users) is calculated utilizing the third algorithm. The process ends at block 414.

The method by which algorithms are utilized to simulate stress of a real world system (stress test systems are mapped to real world systems) is depicted in FIG. 5. The process of FIG. 5 begins at initiator block 500 and proceed to block 502, at which first test parameter, second test parameter, first test data input (FIG. 2 202), second test data input (FIG. 2 204), third test data input (FIG. 2 206), and fifth test data input (FIG. 2 210) are received at the third algorithm. At block 504 the test data inputs, first test parameter, and second test parameter are calculated. The projected system usage is generated at block 506, where projected system usage is the number of projected users for a software system. The projected system usage is transmitted to the production system, at block 508. At block 510, UPM utility (140) utilizes the projected system usage to determine peak usage of the production system (based on the calculations utilizing the algorithms), then UPM utility stores the determined benchmark. Activity of the production system is received, at block 512, and the response time of the production system is monitored. A decision is made at block 514 whether the response time of the production system is equal to the benchmark (established by algorithm and software simulations). If the response time of the software is not equal to the benchmark, the process ends at block 518. If the response time of the software is equal to the benchmark, an alert is generated at block 516. The generated alert identifies the need to adjust one or more activities of the software and hardware components of the production system. The process ends at block 518.

In the flow charts above, one or more of the methods are embodied in a computer readable storage medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a data processing system, a method for determining projected usage and reliability of a software system, said method comprising:
receiving one or more test data inputs in a first algorithm and a second algorithm, wherein the one or more test data inputs are utilized to simulate test conditions of the software system, wherein the first algorithm is a first even distribution-based algorithm which calculates roundup(($I4$/ (($I1*60/I3$)/$I5$)),0), where $I1$, $I3$, $I4$ and $I5$ are test data inputs, wherein the second algorithm is a second even distribution-based algorithm which calculates rounddown((($I1$ *3600-rounddown($I4*I5$/$T1$,0)*$I3$ *60) /rounddown($I4*I5$/$T1$,0)),0), where $T1$ is a first test parameter, and wherein the one or more test data inputs replace one or more variables in the first algorithm and one or more variables in the second algorithm;
generating a first test parameter and a second test parameter, wherein the first test parameter is calculated by evaluating the one or more test data inputs by the first algorithm, and wherein the second test parameter is calculated by evaluating the one or more test data inputs by the second algorithm;
forwarding the first test parameter, the second test parameter, and the one or more test data inputs to a third algorithm which calculates ($I1*3600$/($T2+I3*60$)/ $I5*T1$), where $T2$ is a second test parameter;
in response to calculating the first test parameter via the first even distribution-based algorithm and the second test parameter via the second even-distribution based algorithm, receiving the first test parameter and the second test parameter in the third algorithm, wherein the third algorithm is a third even distribution-based algorithm; and
the third algorithm generating a number of projected users of the software system, wherein the number of projected users of the software system is calculated by evaluating the one or more test data inputs, the first test parameter, and the second test parameter via the third algorithm.

2. The method of claim 1, further comprising:
calculating a projected system usage via the third algorithm, wherein the projected system usage is the number of projected users executing the software system and a distribution of projected users executing the software system; and
outputting the projected system usage.

3. The method of claim 1, further comprising:
the third algorithm receiving the first test parameter, the second test parameter, and the one or more test data inputs;
wherein the first test parameter is a number of concurrent automated users and the second test parameter is a duration of time prior to each iteration of a test activity; and
wherein the one or more test data inputs include: a first test data input, a second test data input, a third test data input, and a fifth test data input.

4. The method of claim 1, further comprising:
receiving the one or more test data inputs, wherein the one or more test data inputs include:
a first test data input, wherein the first test data input is an estimated length of time a real user is active on a software system;
a second test data input, wherein the second test data input is an estimated duration of time for the real user to complete a manual iteration of a test activity;
a third test data input, wherein the third test data input is an estimated duration of time for completing one or more automated iterations of the test activity;
a fourth test data input, wherein the fourth test data input is a number of real users expected to execute the test activity on the software system in an estimated time period; and
a fifth test data input, wherein the fifth test data input is a number of estimated manual iterations performed on the software system by the real user in the estimated time period.

5. The method of claim 1, wherein the second test parameter is calculated via the first algorithm.

6. The method of claim 1, further comprising:
transmitting a projected system usage to a production system, wherein the projected system usage is a gauge to determine a peak usage point of the software system;
recording an activity and a response time of the production system;
determining a peak usage point of the production system; and in response to determining the production system has reached the peak usage point, storing the peak usage point as a benchmark for peak activity of the production system.

7. The method of claim 6, further comprising:

monitoring the response time of the production system while the production system performs one or more activities; and in response to determining the response time of the production system is equal to the benchmark, generating an alert to identify a need to adjust at least one of:

an activity of one or more software components utilized within the production system; and an activity of one or more hardware components utilized within the production system.

8. A computer program product comprising:

a non-transitory computer-readable storage device; and program code on the non-transitory computer-readable storage device that when executed by a computer device provides the functions of:

receiving one or more test data inputs in a first algorithm and a second algorithm, wherein the one or more test data inputs are utilized to simulate test conditions of a software system, wherein the first algorithm is a first even distribution-based algorithm which calculates roundup((I4/ ((I1*60/I3)/I5)),0), where I1, I3, I4 and I5 are test data inputs, wherein the second algorithm is a second even distribution-based algorithm which calculates rounddown(((I1 *3600-rounddown(I4*I5/T1,0)*I3 *60)/rounddown(I4 *I5/T1, 0)),0), where T1 is a first test parameter, and wherein the one or more test data inputs replace one or more variables in the first algorithm and one or more variables in the second algorithm;

generating a first test parameter and a second test parameter, wherein the first test parameter is calculated by evaluating the one or more test data inputs by the first algorithm, and wherein the second test parameter is calculated by evaluating the one or more test data inputs by the second algorithm;

forwarding the first test parameter, the second test parameter, and the one or more test data inputs to a third algorithm which calculates (I1*3600/(T2+ I3*60)/I5*T1), where T2 is a second test parameter;

in response to calculating the first test parameter via the first even distribution-based algorithm and the second test parameter via the second even-distribution based algorithm, receiving the first test parameter and the second test parameter in the third algorithm, wherein the third algorithm is a third even distribution based algorithm;

the third algorithm generating a number of projected users of a software system, wherein the number of projected users of the software system is calculated by evaluating the one or more test data inputs, the first test parameter, and the second test parameter via the third algorithm;

calculating a projected system usage of the software system via the third algorithm, wherein the projected system usage is the number of projected users executing the software system and a distribution of projected users executing the software system; and outputting the projected system usage.

9. The computer program product of claim 8, further comprising program code for:

the third algorithm receiving the first test parameter, the second test parameter, and the one or more test data inputs;

wherein the first test parameter is a number of concurrent automated users and the second test parameter is a duration of time prior to each iteration of a test activity; and wherein the one or more test data inputs include: a first test data input, a second test data input, a third test data input, and a fifth test data input.

10. The computer program product of claim 8, further comprising program code for:

receiving the one or more test data inputs, wherein the one or more test data inputs include:

a first test data input, wherein the first test data input is an estimated length of time a real user is active on the software system;

a second test data input, wherein the second test data input is an estimated duration of time for the real user to complete a manual iteration of a test activity;

a third test data input, wherein the third test data input is an estimated duration of time for completing one or more automated iterations of the test activity;

a fourth test data input, wherein the fourth test data input is a number of real users expected to execute the test activity on the software system in an estimated time period; and a fifth test data input, wherein the fifth test data input is a number of estimated manual iterations performed on the software system by the real user in the estimated time period.

11. The computer program product of claim 8, wherein the second test parameter is calculated via the first algorithm.

12. The computer program product of claim 8, further comprising program code for:

transmitting a projected system usage to a production system, wherein the projected system usage is a gauge to determine a peak usage point of the software system;

recording an activity and a response time of the production system;

determining a peak usage point of the production system;

in response to determining the production system has reached the peak usage point, storing the peak usage point as a benchmark for peak activity of the production system;

monitoring the response time of the production system while the production system performs one or more activities; and in response to determining the response time of the production system is equal to the benchmark, generating an alert to identify a need to adjust at least one of:

an activity of one or more software components utilized within the production system; and an activity of one or more hardware components utilized within the production system.

13. A computer system comprising:

a processor component; and an utility executing on the processor component that enables the computer system to:

receive one or more test data inputs in a first algorithm and a second algorithm, wherein the one or more test data inputs are utilized to simulate test conditions of the computer system, wherein the first algorithm is a first even distribution-based algorithm which calculates roundup((I4/ ((I1*60/I3)I5)),0), where I1, I3, I4 and I5 are test data inputs, wherein the second algorithm is a second even distribution-based algorithm which calculates rounddown(((I1 *3600-rounddown (I4*I5/T1 ,0)*I3 *60) /rounddown(I4 *I5/T1, 0)),0), where T1 is a first test parameter, and wherein the one or more test data inputs replace one or more variables in the first algorithm and one or more variables in the second algorithm;

generate a first test parameter and a second test parameter, wherein the first test parameter is calculated by evaluating the one or more test data inputs by the first algorithm, and wherein the second test parameter is calculated by evaluating the one or more test data inputs by the second algorithm;

forward the first test parameter, the second test parameter, and the one or more test data inputs to a third algorithm which calculates (I1*3600/(T2+I3*60)/I5*T1), where T2 is a second test parameter;

in response to calculating the first test parameter via the first even distribution-based-algorithm and the second test parameter via the second even-distribution based algorithm, receive the first test parameter and the second test parameter in the third algorithm, wherein the third algorithm is a third even distribution based algorithm;

generate, by the third algorithm, a number of projected users of the computer system, wherein the number of projected users of the computer system is calculated by evaluating the one or more test data inputs, the first test parameter, and the second test parameter via the third algorithm;

calculate a projected system usage of a software system via the third algorithm, wherein the projected system usage is the number of projected users executing the software system and a distribution of projected users executing the software system; and output the projected system usage.

14. The computer system of claim 13, said utility further comprising code that enables the computer system to:

receive, by the third algorithm, the first test parameter, the second test parameter, and the one or more test data inputs;

wherein the first test parameter is a number of concurrent automated users and the second test parameter is a duration of time prior to each iteration of a test activity; and wherein the one or more test data inputs include a first test data input, a second test data input, a third test data input, and a fifth test data input.

15. The computer system of claim 13, said utility further comprising code that enables the computer system to:

receive the one or more test data inputs, wherein the one or more test data inputs include:
  a first test data input, wherein the first test data input is an estimated length of time a real user is active on a computer system;
  a second test data input, wherein the second test data input is an estimated duration of time for the real user to complete a manual iteration of a test activity;
  a third test data input, wherein the third test data input is an estimated duration of time for completing one or more automated iterations of the test activity;
  a fourth test data input, wherein the fourth test data input is a number of real users expected to execute the test activity on the computer system in an estimated time period; and
  a fifth test data input, wherein the fifth test data input is a number of estimated manual iterations performed on the computer system by the real user in the estimated time period.

16. The computer system of claim 13, wherein the second test parameter is calculated via the first algorithm.

17. The computer system of claim 13, said utility further comprising code that enables the computer system to:

transmit a projected system usage to a production system, wherein the projected system usage is a gauge to determine a peak usage point of the computer system;

record an activity and a response time of the production system;

determine a peak usage point of the production system;

in response to determining the production system has reached the peak usage point, store the peak usage point as a benchmark for peak activity of the production system;

monitor the response time of the production system while the production system performs one or more activities; and in response to determining the response time of the production system is equal to the benchmark, generate an alert to identify a need to adjust at least one of:
  an activity of one or more software components utilized within the production system; and
  an activity of one or more hardware components utilized within the production system.

* * * * *